United States Patent [19]

Leighton et al.

[11] 4,317,429

[45] Mar. 2, 1982

[54] REUSABLE PLASTIC REARING PANEL APPLICABLE TO AQUACULTURE

[75] Inventors: David L. Leighton, San Diego; Charles F. Phleger, Solana Beach, both of Calif.

[73] Assignee: The Regents of the University of California, Berkeley, Calif.

[21] Appl. No.: 98,882

[22] Filed: Nov. 30, 1979

[51] Int. Cl.³ .............................................. A01K 61/00
[52] U.S. Cl. ......................................................... 119/2
[58] Field of Search .................................. 119/2, 3, 4

[56] References Cited

U.S. PATENT DOCUMENTS

| | | | |
|---|---|---|---|
| 2,989,945 | 6/1961 | Ford | 119/2 X |
| 3,316,881 | 5/1967 | Fischer | 119/4 |
| 3,601,095 | 8/1971 | Olsson | 119/2 |
| 3,702,599 | 11/1972 | Herolzer | 119/4 |
| 4,212,268 | 7/1980 | Chapman | 119/3 X |
| 4,214,551 | 7/1980 | McNeil et al. | 119/3 |

*Primary Examiner*—Robert Peshock
*Assistant Examiner*—Robert P. Swiatek
*Attorney, Agent, or Firm*—Herzig & Walsh, Inc.

[57] ABSTRACT

A reusable plastic rearing panel applicable to aquaculture comprises a molded plastic panel having a plurality of recesses therein for nurturing and rearing rock scallops and other filter feeding bivalve mollusks with similar habits from juvenile stages to marketable adult size. At the bottom and sides of the recesses are defined perforations for relief permitting attachment of the contained bivalve by the bivalve's cementation. The recesses in the panels are covered by mesh to contain and protect the shellfish and to afford at the same time opportunities for feeding on waterborne sources of nutrition, such as natural plankton. The meshing is removably attached so that after affixation of the shellfish to the recess, it may be removed; alternatively, the mesh is fabricated of material which naturally disintegrates under the chemical and physical conditions in which the panels are utilized. To augment attachment of the shellfish to the recesses, a line is tied through two of the perforations in bottoms of the recesses so that as the shellfish grows, shell material is deposited around the line until it is incorporated securely in the shell. Use of such a line affords the capability of employing the invention in connection with rearing shellfish which do not cement to firm substrates. Pluralities of panels may be arrayed vertically or horizontally in an aquatic environment and may be attached to pilings or secured by buoys.

4 Claims, 10 Drawing Figures

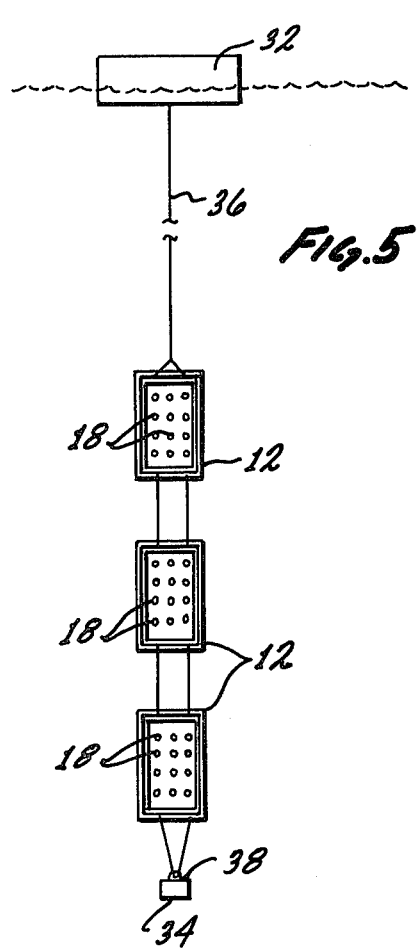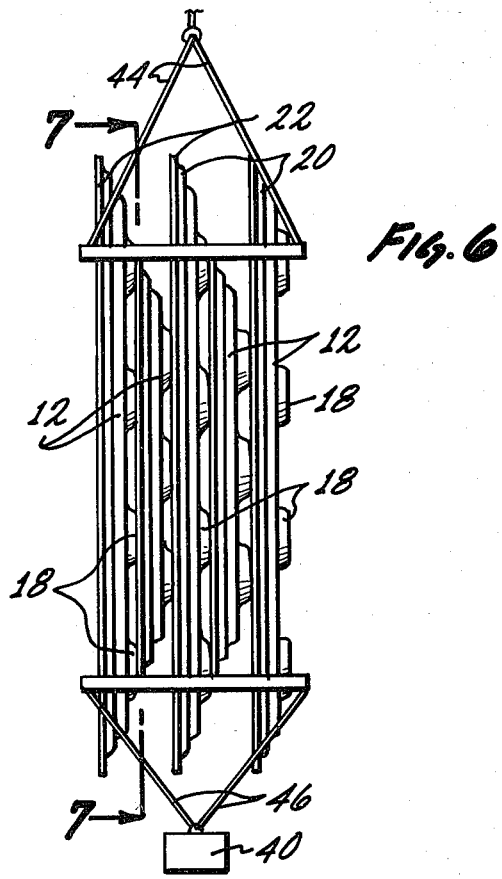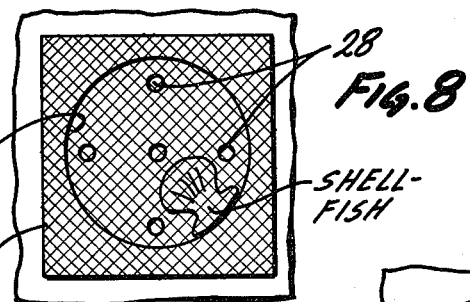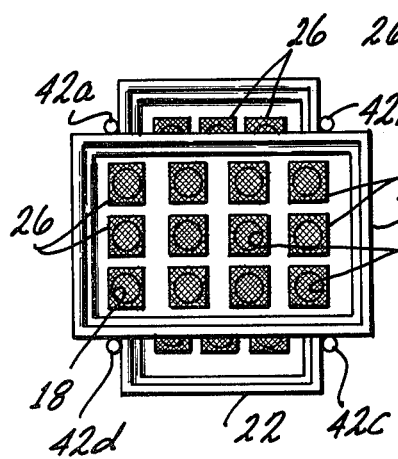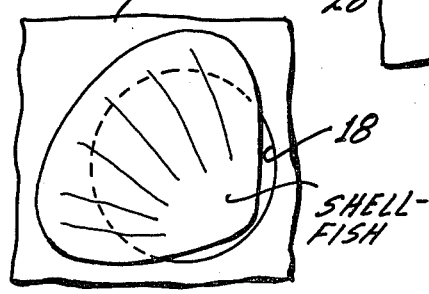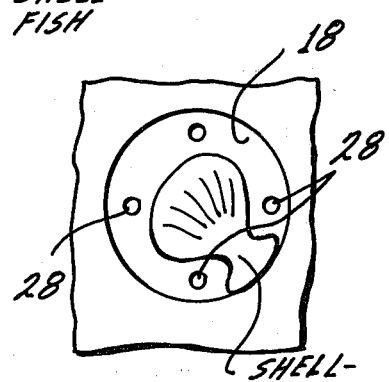

4,317,429

REUSABLE PLASTIC REARING PANEL APPLICABLE TO AQUACULTURE

The Government has rights in this invention pursuant to Grant No. 04-7-158-44121 awarded by the United States Department of Commerce.

BACKGROUND OF THE INVENTION

1. Field of the Invention

The invention pertains to apparatus for containing and rearing filter feeding bivalve mollusks and rock scallops, in particular.

2. Description of the Prior Art

The worldwide demand for food, particularly protein, continues to increase sharply due to the explosive growth of population and other factors. In response thereto, attempts have been made to augment and improve the harvest of seafood, including fish and shellfish. Numerous devices for nurturing and culturing shellfish exist, none of which are entirely satisfactory from the point of view of cost-effectiveness. An example is the device described in U.S. Pat. No. 3,702,599 to Herolzer. The Herolzer device requires that a plurality of trays be stacked in a complicated arrangement utilizing various devices, such as straps and special structural features on each tray to promote stacking. The complexity of the stacking arrangement and the necessity therefor, thereby precluding the use of individual as opposed to multiple trays which might be desirable in particular contexts, adversely affect the effectiveness of the device.

A further example is the device described in U.S. Pat. No. 3,704,159 to Halaunbrenner. The device described in Halaunbrenner utilizes a structure for holding a stack of containers for shellfish. The structure is relatively complex and includes a substantial amount of unutilized space at the central region thereof, adversely affecting the cost-effectiveness of the device.

Thus, there has been a felt but unfulfilled need for a system for rearing and containing shellfish, particularly rock scallops, which is at the same time effective and economical.

SUMMARY OF THE INVENTION

Apparatus for rearing shellfish comprises a panel defining at least one recess for containment of a maturing shellfish and having at least one hole within the recess to provide relief for cementation thereto by a shellfish, and mesh means disposed over the recess for containment of the shellfish while affording access to waterborne sources of nutrition for ingestion by the shellfish within the recess. The panels may be used in pluralities in vertical or stacked array. When stacked, the panels may be crossed and connected to one another through connectors attached to the panels at the corners formed by successive stacked pairs of crossed panels.

BRIEF DESCRIPTION OF THE DRAWINGS

FIG. 5 is a perspective view, somewhat simplified, of a plurality of panels in accordance with the invention depicted in an aquatic environment;

FIG. 6 is a perspective view, somewhat simplified, of an alternative arrangement of a plurality of panels in accordance with the invention disposed in an aquatic environment;

FIG. 7 is a sectional view through the line 7—7 of the device depicted in FIG. 6; and FIGS. 8 through 10, inclusive, are fragmentary views of a panel in accordance with the invention depicting the growth and affixation therein of an individual shellfish.

DETAILED DESCRIPTION OF A PREFERRED EMBODIMENT

A panel 12 for rearing shellfish is generally rectangular in configuration. Panel 12 includes a base 14 and is bounded by walls 16. Base 14 defines a plurality of recesses or holes 18. In the preferred embodiment, the panel 12 is integral and is composed of molded plastic though, of course, other modes of fabrication may be employed in accordance with the invention. Polyurethane or similar plastic material may be employed.

Figure 1:
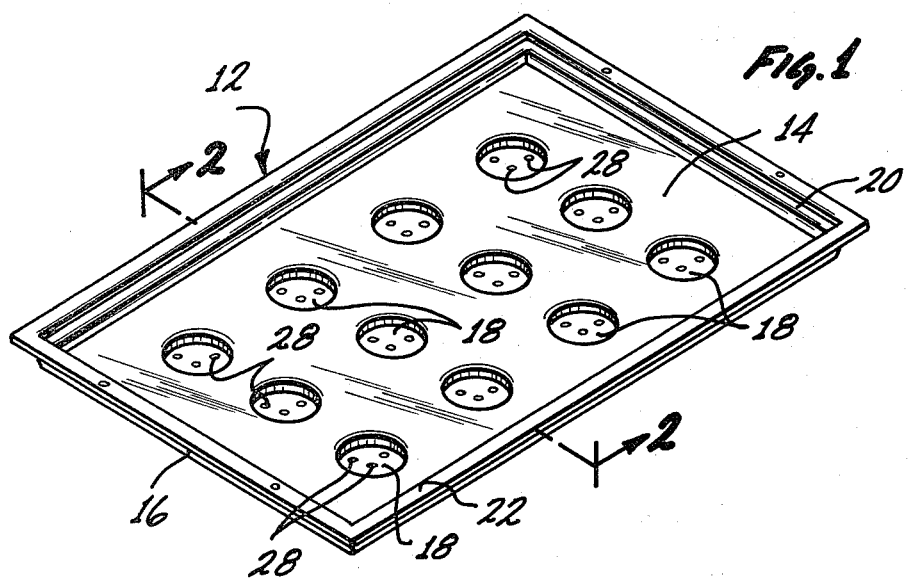
FIG. 1 is a perspective view of a panel in accordance with the invention.
Figure 2:
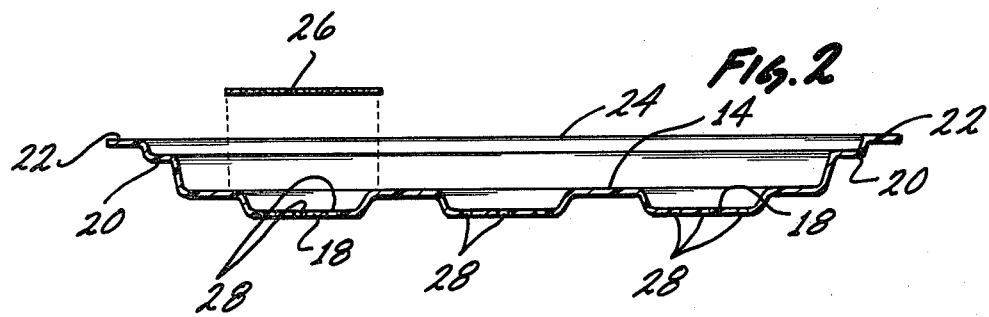
FIG. 2 is a sectional view through the line 2—2 of the panel depicted in FIG. 1.
Figure 3:
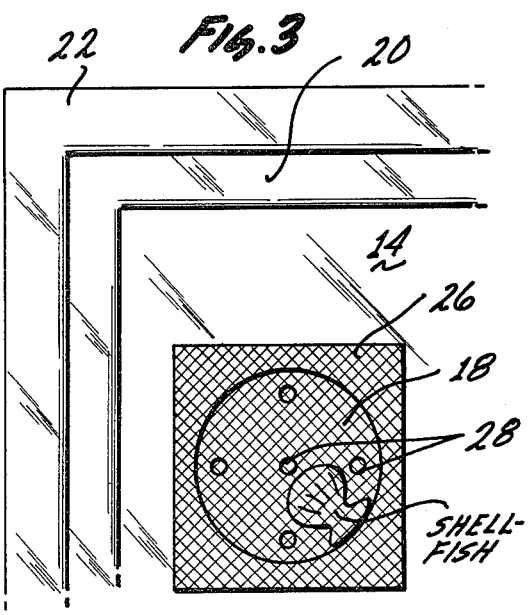
FIG. 3 is a fragmentary view of a portion of a panel in accordance with the invention.

Referring also to FIG. 2, walls 16 have upper portions extending above the base 14 and include shoulders 20. Above shoulders 20, the walls 16 define flanges 22. A longitudinal member 24 employed in connection with utilization of a plurality of panels, as is more fully explained hereinbelow, rests upon shoulders 20 and covers the base 14. Each recess 18 is covered by a piece of mesh 26. (For exemplary purposes, only one piece of mesh covering one recess is depicted). Mesh 26 is attached to base 14 by conventional means, such as gluing. The mesh may be composed of plastic material, such as polyethylene or polypropylene; metal, such as ordinary aluminum window screen; or textile fabric, such as a combination of cotton and acetate or polyester as used in, for example, mosquito netting. As more fully disclosed hereinafter, the mesh is temporary and is removed at a particular cycle of the life of the shellfish in the recess covered by the mesh. Plastic and metal mesh are specially removed at this stage of the life cycle, whereas textile mesh, with a limited longevity in seawater, eventually disintegrates through bacterial action, thus obviating the need for special arrangements to remove the mesh.

Recesses 18 define at the bottoms thereof a plurality of holes 28. As depicted, holes 28 are six in number for each recess; however, in accordance with the invention, different numbers may be employed.

In a particular application, a panel 12 having dimensions substantially 16"×24" and containing 12 recesses was found to give successful results.

As best seen in FIGS. 3, 4, 8, 9, and 10, in operation of a panel in accordance with the invention, a shellfish, such as a rock scallop (depicted in simplified form) in a juvenile stage, is introduced into one of the recesses 18. Introduction of the shellfish may be through a slit (not shown) in mesh 26 or may precede affixation of the mesh above the recess. The mesh 26 serves the purpose of protecting and containing juvenile shellfish and at the same time permitting feeding on waterborne sources of nutrition, such as natural plankton. After the individual shellfish has achieved sufficient maturity to affix itself by shell cementation to the recess, the mesh 18 is no longer necessary. Removal of the mesh may be effected by simply pulling it away from its points of attachment to the base 14. When mesh 26 is composed of material degradable in seawater, such as textile fabric comprising, for example, mosquito netting, the mesh timely disintegrates under the action of the environment when the shellfish will have affixed itself to the panel, thus obviating the need for special provisions for removing the mesh.

FIGS. 8, 9, and 10 depict in some detail the progress of growth of a shellfish disposed within a recess 26 of a panel 12 in accordance with the invention. The individual depicted in FIG. 8 is at a juvenile stage. An intermediate stage is depicted in FIG. 10, and in FIG. 9, the condition of the shellfish in the mature state is depicted. At maturity, the shellfish reared in panels in accordance with the invention can be harvested by simple pulling away of the individuals from their points of affixation to the recesses. It has been found that such separation from points of attachment can be effected simply and without damage to either the panel or to the shellfish. After removal, the panels are prepared for reuse by soaking in fresh-water or salt brine for a short period of time. New pieces of mesh are installed in place, and the next crop of juvenile shellfish is introduced.

Figure 4:
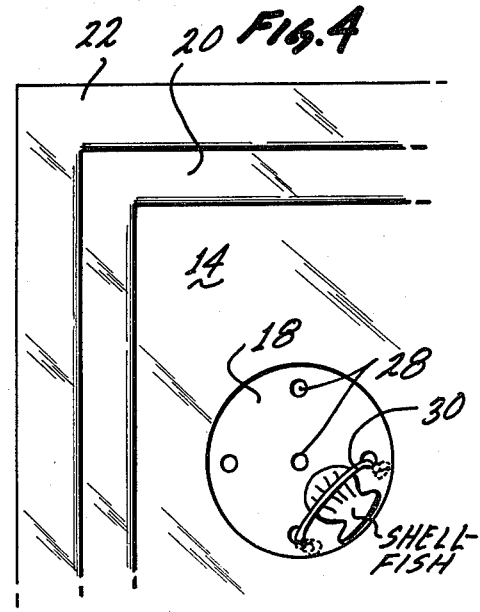
FIG. 4 is a fragmentary view of a panel in accordance with the invention, including an additional means for facilitating affixation of a shellfish to the panel.

FIG. 4 depicts a panel in accordance with the invention which has particular application to rearing of shellfish which incompletely cement themselves to firm substrates or wherein currents or other environmental conditions would tend to dislodge shellfish from panels in accordance with the invention. A line 30 is threaded through two of the perforations 28 at the bottom of a recess 18. Line 30 may be comprised of metallic wire or of nylon filament, or the like. As depicted in FIG. 4, as the shellfish in the recess 18 grows, shell material is deposited around the line 30 until line 30 is incorporated within the shell. At harvest, the line is simply cut when the individual in the recess is removed from the recess 18. Thus, for those species which provide adequate cementative attachment through their own natural processes, affixation is augmented to withstand unusual environmental conditions which would tend to dislodge the individual, and those species which do not adequately cement to a firm substrate, such as mussels, clams, and certain scallop species, can be reared in panels in accordance with the invention incorporating line 30 to facilitate attachment As depicted in FIG. 5, a plurality of panels 12 in accordance with the invention can be employed concurrently. A plurality of panels 12 in accordance with the invention are submerged in seawater and are connected between a float member 32 floating at the surface of the water and a weight or anchor 34 below the surface. The panels 12 are arranged in a vertical array between the float 32 and the anchor 34. A line 36 connects the panels 12 between float 32 and anchor 34. Line 36 is threaded through holes (not shown) at the upper and lower portions of each panel and passes from the lower portion of a particular panel through the upper portion of the next succeeding panel and is connected to weight 34 through a hook 38. Thus, the panels are held substantially vertically with the recesses disposed horizontally. Because of the particular features of the invention, such an array is rendered possible without risk of loss of shellfish within the recesses of the panels. The vertical arrangement is advantageous in particular applications wherein the environment available for aquaculture has some depth but is not particularly wide.

As depicted in FIG. 7, a further arrangement of an array of panels 12 in accordance with the invention comprises a plurality of panels 12. Panels 12 are arranged alternatively vertically and horizontally so that each panel which is oriented so that its long dimension is vertical is followed by a panel positioned so that its long dimension is horizontal (i.e., each panel is displaced by an angle of substantially 90° from the adjoining panel). As in the arrangement depicted in FIG. 6, the array of panels is held beneath the surface by a weight or anchor 40.

Between each pair of successive panels 12 is disposed a cover member 24 described hereinabove. The cover member, which may be fabricated of molded plastic like the panel 12, protects the integrity of the mesh and recesses of the panel with which it is used while the panel is in the stacked array. In the arrangement depicted, the bottoms of walls 18 of any particular panel 12 will contact the cover member 24 and flanges 22 of the adjoining panel to the right. The stacked array is supported by supports 42a, 42b, 42c, 42d. Supports 42a, 42b, 42c, 42d are in the form of semi-rigid pipes, composed of material, such as polyvinylchloride. The pipe supports are attached by conventional methods, such as gluing, to the edges of panels 12. Pipes 42a, 42b are disposed at the upper end of the stack and are supported by lines 44 attached to a float or other object above the surface of the water (not shown). Pipes 42c, 42d are disposed at the lower end of the stack of panels 12 and are fastened by lines 46 to anchor 40. Thus, the stack of panels 12 is held in a desired position submerged in seawater.

The pipes 42a, 42b, 42c, 42d are disposed such that they are substantially parallel to one another and contact the edges of successive pairs of crossed panels at the "corners" formed by the successive crossed panels. Since the panels are arranged substantially parallel to one another, pipes 42 are substantially parallel to one another and are positioned along paths defined by the "corners" defined by the crossed panels.

Stacked arrays of panels in accordance with the invention can be utilized on a highly cost-effective basis for aquaculture of shellfish therein in regions where the area available for aquaculture is relatively limited, due to the flexibility of the stacking capability provided by the invention. Stacks of panels in accordance with the invention are compact, readily assembled, and easily disassembled.

Thus, in accordance with the invention, panels for rearing shellfish are provided which combine the advantages of simplicity, versatility, and effectiveness.

Though a particular embodiment of the invention is described and depicted hereinabove, the invention is defined solely by the appended claims interpreted in light of the specification and drawings.

What is claimed is:
1. Apparatus for rearing shellfish comprising:
 a plurality of panels, each one of said plurality of panels defining at least one recess therein for containment of a maturing shellfish, said panel defining at least one hole within said recess for providing relief for cementation thereto by a shellfish; and
 mesh means disposed over said at least one recess of each one of said plurality of panels for containment of a shellfish therein while affording access to waterborne sources of nutrition for ingestion by said shellfish within said at least one recess, said plurality of said panels being joined together end to end by lines connectable to means for submerging and suspending said plurality of panels in an aquatic environment.

2. Apparatus for rearing shellfish comprising:

a plurality of panels, each of said panels having a long dimension and a short dimension and defining at least one recess therein for containment of a maturing shellfish, each of said panels defining at least one hole within said at least one recess for providing relief for cementation thereto by a shellfish, said plurality of panels being stacked with respect to one another such that adjoining panels are arranged so that the long dimension of a panel is transverse to the long dimension of an adjoining panel and further including semi-rigid elongated means attached to the long dimension of each of said panels to hold said plurality of panels in said arrangement; and mesh means disposed over each of said recesses for containment of a shellfish therein while affording access to waterborne sources of nutrition for ingestion by said shellfish within said recess.

3. Apparatus for rearing shellfish comprising:

a panel, said panel defining at least one recess therein for containment of a maturing shellfish, said panel defining at least one hole within said at least one recess for providing relief for cementation thereto by a shellfish;

mesh means disposed over said at least one recess for containment of a shellfish therein while affording access to waterborne sources of nutrition for ingestion by said shellfish within said at least one recess, said at least one recess defining at least two holes at the bottom portion thereof and line means threaded between and through said at least two holes to augment affixation to said at least one recess by shellfish therein, such that said line is incorporated into the shell of the developing shellfish.

4. Apparatus for rearing shellfish comprising:

a plurality of panels, each of said panels including a base portion defining at least one recess therein for containment of a maturing shellfish and including walls having portions above said base portion to define shoulders for receiving therein a cover member;

mesh means disposed over said at least one recess of each of said panels for containment of a shellfish within said recess while affording access to waterborne sources of nutrition for injection by said shellfish within said at least one recess;

a plurality of cover members received within said shoulders of said walls of each of said panels, each of said panels having a long dimension and a short dimension, said plurality of panels being stacked with respect to one another such that adjoining panels are arranged so that the long dimension of one panel is substantially transverse to the long dimension of an adjoining panel, said cover members being attached to said shoulders of each of said panels in said plurality of panels such that the underside of a panel is in contact with the cover member of an adjoining panel; and elongated means attached to the long dimensions of each of said panels to hold said plurality of panels in said arrangement.

* * * * *